United States Patent
Su

(10) Patent No.: US 11,573,737 B2
(45) Date of Patent: Feb. 7, 2023

(54) METHOD AND APPARATUS FOR PERFORMING DISK MANAGEMENT OF ALL FLASH ARRAY SERVER

(71) Applicant: Silicon Motion, Inc., Hsinchu County (TW)

(72) Inventor: Zheng-Jia Su, Changhua County (TW)

(73) Assignee: Silicon Motion, Inc., Hsinchu County (TW)

( * ) Notice: Subject to any disclaimer, the term of this patent is extended or adjusted under 35 U.S.C. 154(b) by 142 days.

(21) Appl. No.: 17/149,730

(22) Filed: Jan. 15, 2021

(65) Prior Publication Data

US 2021/0271418 A1 Sep. 2, 2021

Related U.S. Application Data

(60) Provisional application No. 62/983,767, filed on Mar. 2, 2020.

(51) Int. Cl.
| | |
|---|---|
| *G06F 11/00* | (2006.01) |
| *G06F 3/06* | (2006.01) |
| *G06F 11/20* | (2006.01) |
| *G06F 9/50* | (2006.01) |
| *G06F 11/14* | (2006.01) |
| *G06F 11/07* | (2006.01) |

(52) U.S. Cl.
CPC .......... *G06F 3/0659* (2013.01); *G06F 3/0604* (2013.01); *G06F 3/0688* (2013.01); *G06F 9/5016* (2013.01); *G06F 11/0727* (2013.01); *G06F 11/142* (2013.01); *G06F 11/2094* (2013.01)

(58) Field of Classification Search
CPC .. G06F 11/142; G06F 11/0727; G06F 3/0604; G06F 3/0688
See application file for complete search history.

(56) References Cited

U.S. PATENT DOCUMENTS

| 2017/0329714 | A1* | 11/2017 | Jin ......................... G06F 3/067 |
| 2020/0327014 | A1* | 10/2020 | Creed ................. G06F 11/1092 |
| 2021/0271418 | A1* | 9/2021 | Su ......................... G06F 3/0635 |

FOREIGN PATENT DOCUMENTS

| TW | 200821908 | | 5/2008 |
| TW | 201730771 | A | 9/2017 |
| TW | 201928977 | A | 7/2019 |

* cited by examiner

*Primary Examiner* — Philip Guyton
(74) *Attorney, Agent, or Firm* — Winston Hsu

(57) ABSTRACT

A method and apparatus for performing disk management of an all flash array (AFA) server are provided. The method may include: utilizing a disk manager module among multiple program modules running on any node of multiple nodes of the AFA server to trigger a hardware layer of the any node to perform disk switching control in HA architecture of the AFA server, for controlling the any node to enable a set of disk switching paths between the any node and a group of storage devices among multiple sets of disk switching paths between the multiple nodes and multiple groups of storage devices; and utilizing the disk manager module to perform multiple groups of operations respectively corresponding to multiple disk pools in a parallel processing manner, for managing the group of storage devices with the multiple disk pools, wherein the multiple disk pools may include active, inserted, and failure disk pools.

11 Claims, 12 Drawing Sheets

METHOD AND APPARATUS FOR PERFORMING DISK MANAGEMENT OF ALL FLASH ARRAY SERVER

CROSS REFERENCE TO RELATED APPLICATIONS

This application claims the benefit of U.S. Provisional Application No. 62/983,767, which was filed on Mar. 2, 2020, and is included herein by reference.

BACKGROUND OF THE INVENTION

1. Field of the Invention

The present invention is related to memory control, and more particularly, to a method for performing disk management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As Flash memories have been widely applied to various data storage device such as solid state drives (SSDs), etc., it is proposed in the related art to implement the data storage server to be a Flash type data storage server using Flash memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a method for performing disk management of an all flash array (AFA) server, and associated apparatus (e.g. the AFA server, a control circuit thereof, etc.), in order to solve the above-mentioned problems.

It is another objective of the present invention to provide a method for performing disk management of an AFA server, and associated apparatus (e.g. the AFA server, a control circuit thereof, etc.), in order to protect data in the AFA server and guarantee correct disk operations thereof.

At least one embodiment of the present invention provides a method for performing disk management of an AFA server, where the method may comprise: utilizing a disk manager module among multiple program modules running on any node of multiple nodes of the AFA server to trigger a hardware layer of the any node to perform disk switching control in a high availability (HA) architecture of the AFA server, for controlling the any node to enable a set of disk switching paths between the any node and a group of storage devices among multiple sets of disk switching paths between the multiple nodes and multiple groups of storage devices, the multiple groups of storage devices comprising the group of storage devices, wherein the multiple groups of storage devices are implemented with multiple groups of solid state drives (SSDs), respectively; and utilizing the disk manager module to perform multiple groups of operations respectively corresponding to multiple disk pools in a parallel processing manner, for managing the group of storage devices with the multiple disk pools, wherein the multiple disk pools comprise an active disk pool, an inserted disk pool, and a failure disk pool, and the multiple groups of operations comprise: a first group of operations corresponding to the active disk pool, configured to manage multiple active storage devices in the active disk pool; a second group of operations corresponding to the inserted disk pool, configured to manage any inserted storage device in the inserted disk pool, wherein the any inserted storage device represents any new storage device added into the group of storage devices; and a third group of operations corresponding to the failure disk pool, configured to manage any failure storage device in the failure disk pool, wherein the any failure storage device represents any critical or invalid storage device needing being removed from the group of storage devices.

At least one embodiment of the present invention provides an all flash array (AFA) server. The AFA server may comprise multiple nodes and a plurality of storage devices. More particularly, any node of the multiple nodes comprises: at least one processor, arranged to control operations of the any node under control of multiple program modules; and multiple hardware components in a hardware layer of the any node. The plurality of storage devices may comprise multiple groups of storage devices, wherein the multiple groups of storage devices are implemented with multiple groups of SSDs, respectively. For example, the any node utilizes a disk manager module among the multiple program modules running on the any node to trigger the hardware layer of the any node to perform disk switching control in a high availability (HA) architecture of the AFA server, for controlling the any node to enable a set of disk switching paths between the any node and a group of storage devices among multiple sets of disk switching paths between the multiple nodes and the multiple groups of storage devices, the multiple groups of storage devices comprising the group of storage devices; and the any node utilizes the disk manager module to perform multiple groups of operations respectively corresponding to multiple disk pools in a parallel processing manner, for managing the group of storage devices with the multiple disk pools, wherein the multiple disk pools comprise an active disk pool, an inserted disk pool, and a failure disk pool, and the multiple groups of operations comprise: a first group of operations corresponding to the active disk pool, configured to manage multiple active storage devices in the active disk pool; a second group of operations corresponding to the inserted disk pool, configured to manage any inserted storage device in the inserted disk pool, wherein the any inserted storage device represents any new storage device added into the group of storage devices; and a third group of operations corresponding to the failure disk pool, configured to manage any failure storage device in the failure disk pool, wherein the any failure storage device represents any critical or invalid storage device needing being removed from the group of storage devices.

The present invention method and associated apparatus (e.g. the AFA server, a control circuit thereof, etc.) can enhance overall performance, and protect data according to multiple control schemes of the method, and more particularly, guarantee correct disk operations of the AFA server. In addition, the present invention method and associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
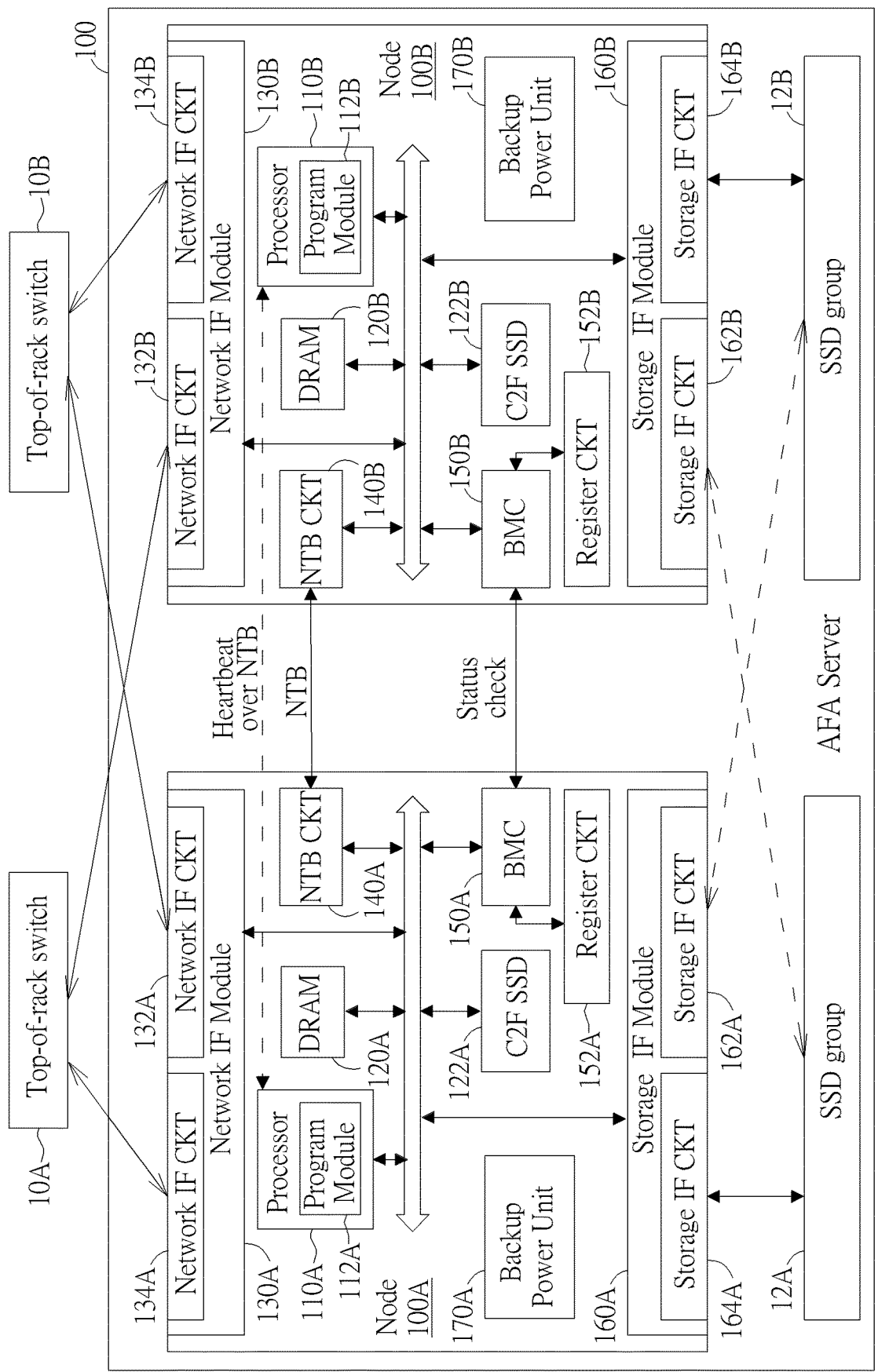
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120B, a C2F SSD 122B, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150B, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g. main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122B, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120B, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120B, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 110B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
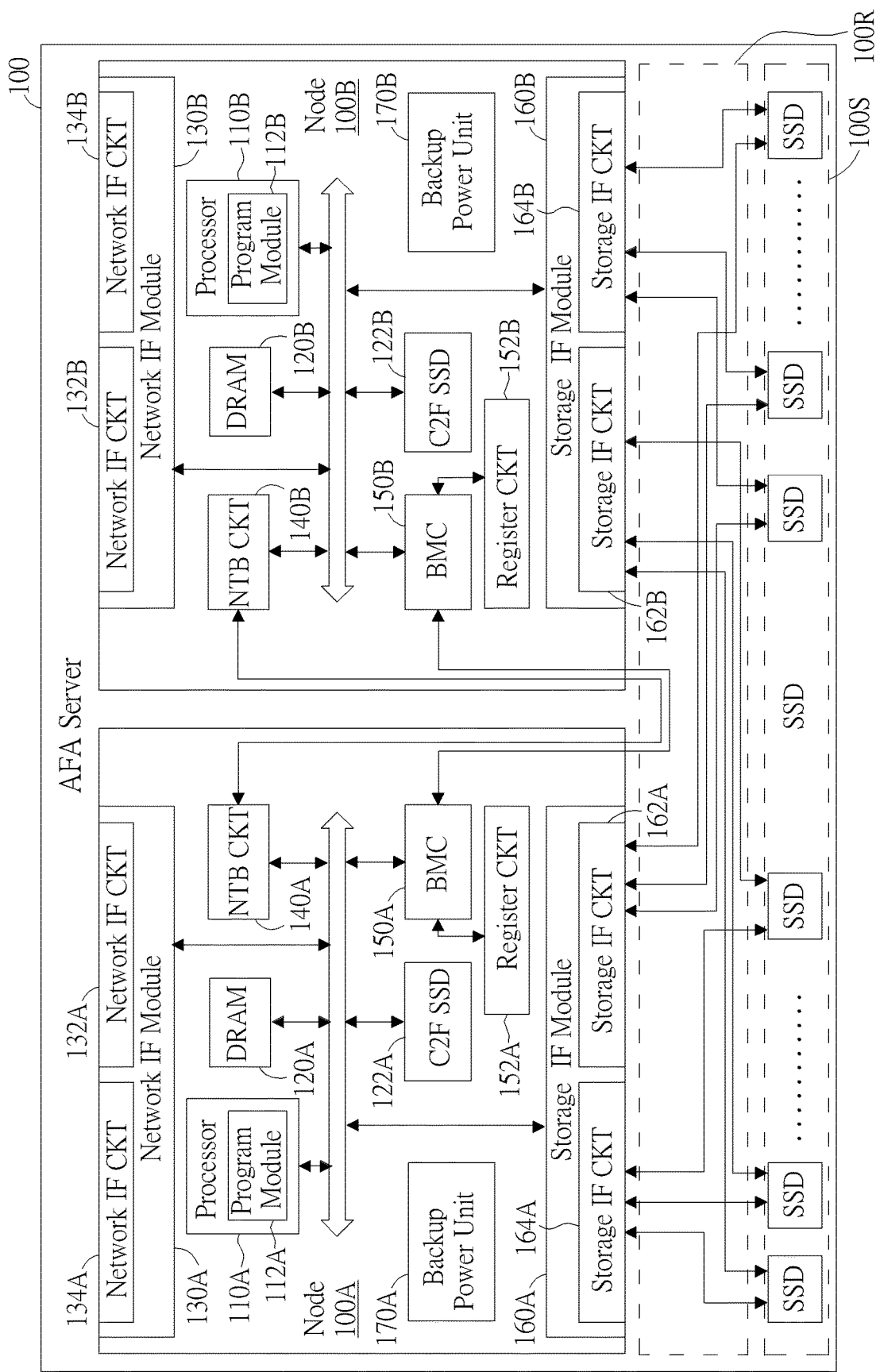
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
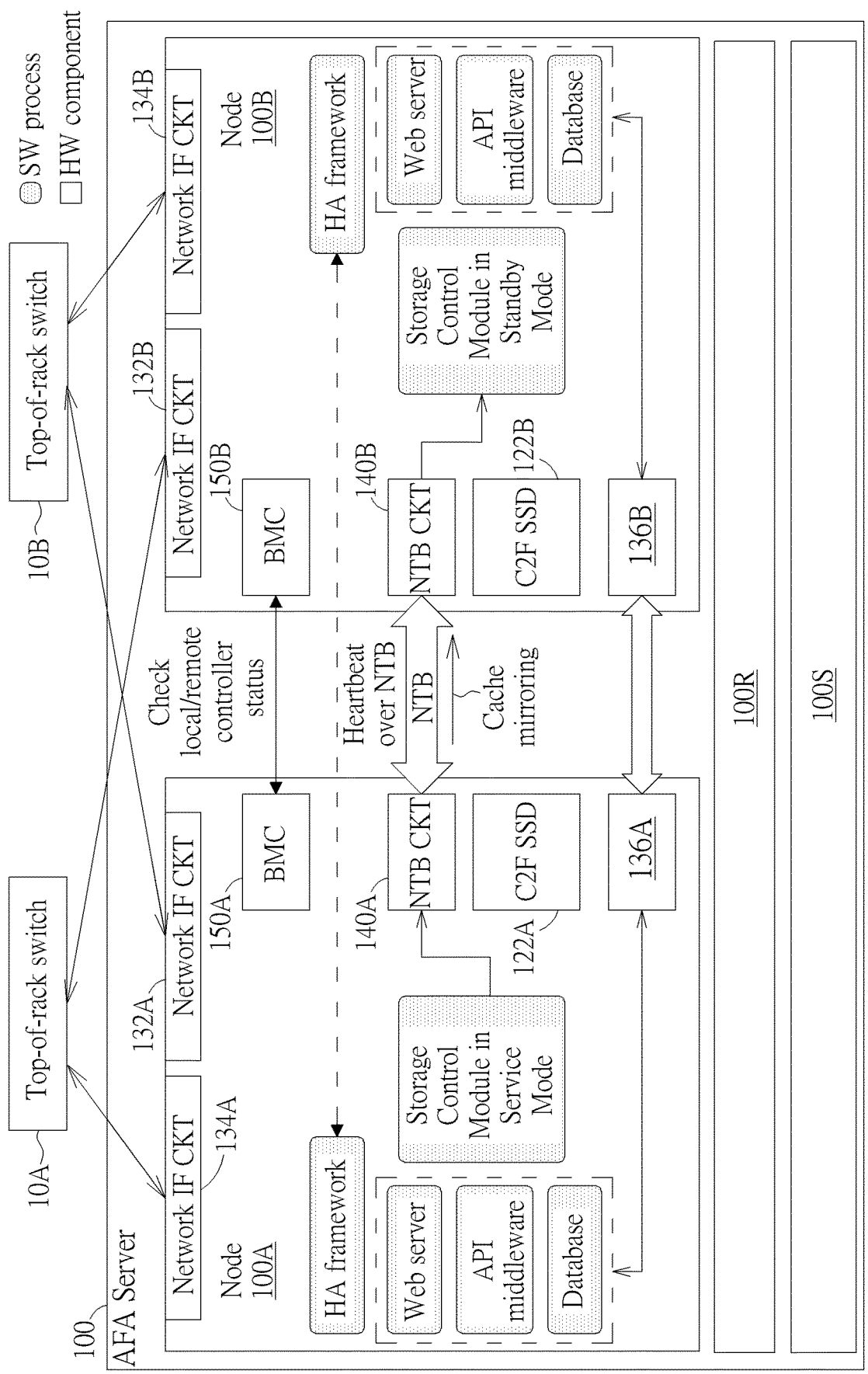
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
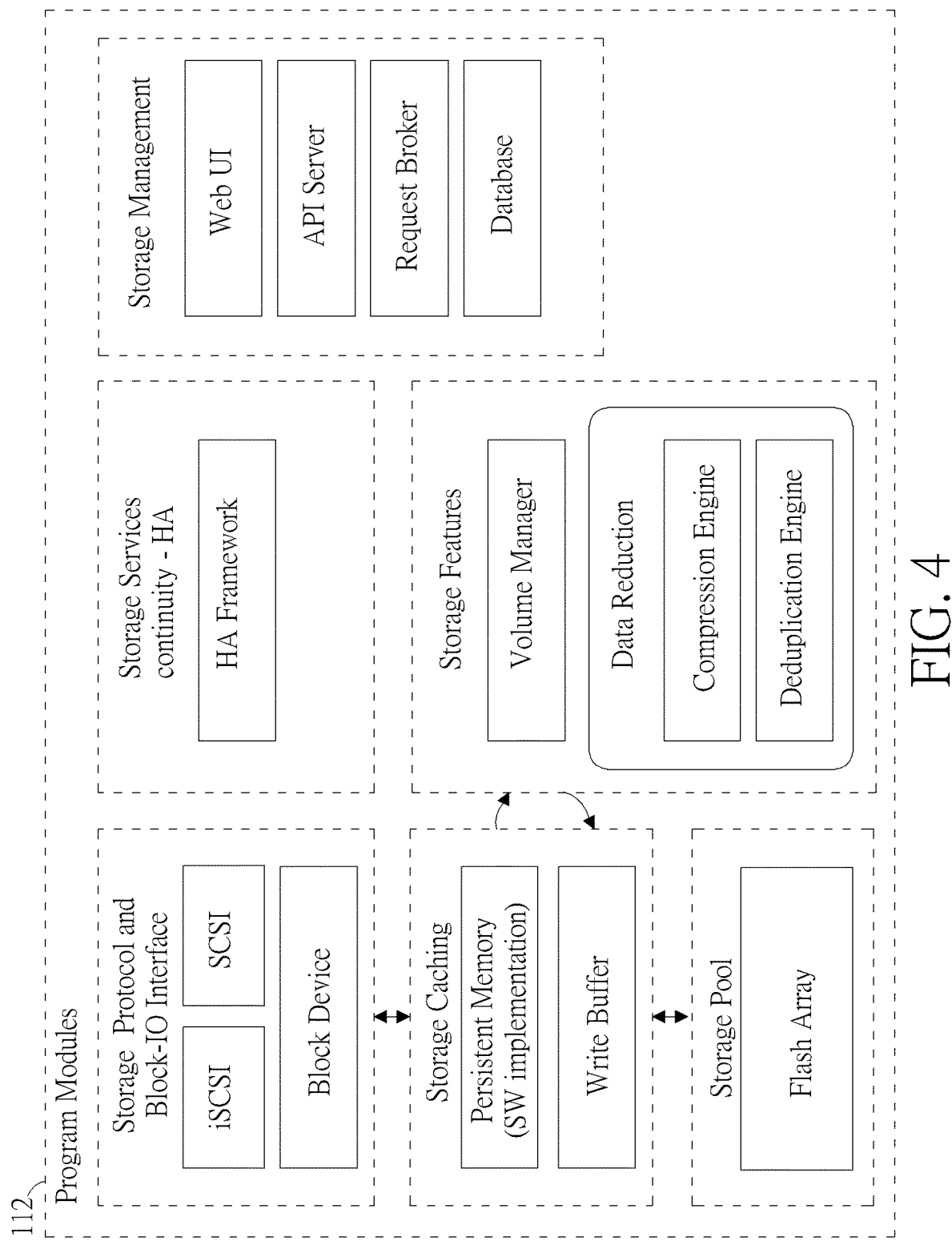
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (IO) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-IO Interface module and the Storage Pool module can be configured to interact with the client device and the SSD group, but the present invention is not limited thereto. When there is a need, the node can trigger other program modules to interact with one or more of these program modules.

The Storage Protocol and Block-TO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array for brevity). The Storage Services continuity—HA module may comprise a sub-module such as a HA Framework module (labeled "HA Framework" for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UT) module, an Application Programming Interface (API) Server module, a Request Broker module and a Database module (respectively labeled "Web UT", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
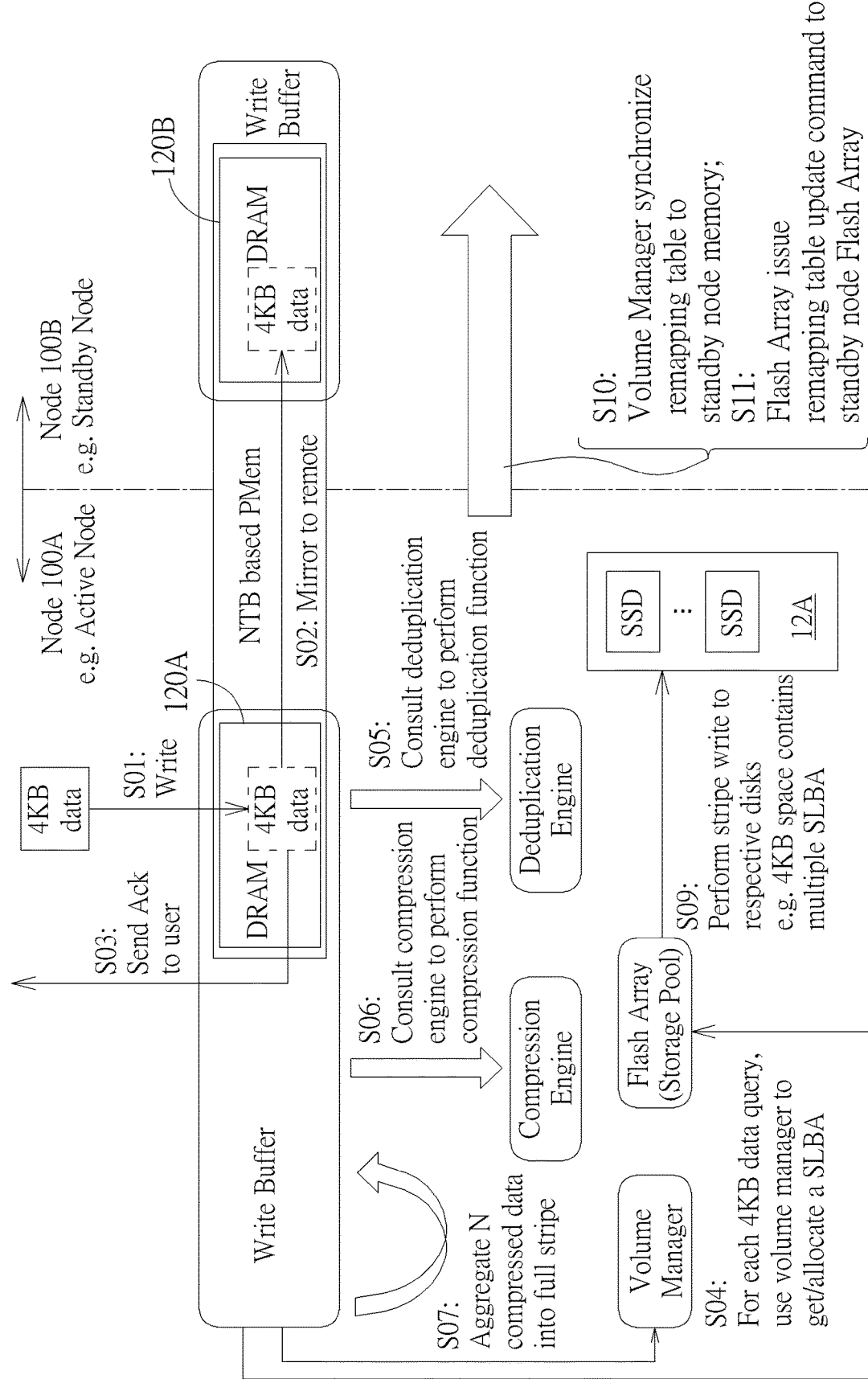
FIG. 5 illustrates a write control scheme of a method for performing disk management of an AFA server such as that shown in FIG. 1 according to an embodiment of the present invention.

FIG. 5 illustrates a write control scheme of a method for performing disk management of an AFA server such as that shown in FIG. 1 according to an embodiment of the present invention. The method can be applied to the AFA server 100 shown in FIG. 1. For better comprehension, the nodes 100A and 100B can play the role of the active node and the role of the standby node, respectively, but the present invention is not limited thereto. In response to the write request, the active node (e.g. one of the nodes 100A and 100B, such as the node 100A in this embodiment) can utilize the Write Buffer module to receive data (e.g. 4 kilobytes (KB) data, referred to as 4 KB data for brevity) corresponding to the write request and write (e.g. buffer) the data into the write buffer thereof (e.g. the DRAM of this node) in Step S01, mirror the data such as the 4 KB data to the standby node (e.g. another of the nodes 100A and 100B, such as the node 100B in this embodiment) through the NTB path in Step S02, and send an acknowledgement (Ack) corresponding to the write request to the client device of the user in Step S03. As the data has been mirrored to the remote side (e.g. the DRAM 120B in this embodiment), the mirrored data is protected by the standby node (e.g. the Write Buffer module thereof).

Regarding subsequent operations of the active node, in Step S04, for each 4 KB data query, the Write Buffer module can use the Volume Manager module to get or allocate a storage pool logical block address (SLBA) for the data. In Step S05, the Write Buffer module can consult the Deduplication Engine to perform a deduplication function on the data. In Step S06, the Write Buffer module can consult the Compression Engine to perform a compression function on the data. In Step S07, when a data amount of buffered data (e.g. the data to be written) in the DRAM (e.g. the DRAM 120A in this embodiment) reaches a predetermined threshold, for example, the active node has collected N sets of compressed data and the total data amount of the N sets of compressed data is suitable for being stored as a full stripe, the active node can utilize the Flash Array module to aggregate the N sets of compressed data (which can be referred to as N compressed data for brevity) into the full stripe. For example, the full stripe may represent a stripe comprising a predetermined number of chunks (e.g. twelve chunks), where these chunks may comprise a first predetermined number of data chunks (e.g. ten data chunks) and a second predetermined number of parity chunks (e.g. two parity chunks). In Step S08, after collecting one or more stripes such as a predetermined amount of stripes (e.g. any of one stripe, two stripes, three stripes, four stripes, etc., depending on various control schemes of the method), the active node can utilize the Write Buffer module to submit array information such as an array of SLBAs, an array of compressed data, etc. (e.g. the array of {Array of SLBAs, Array of compressed data}) to the Flash Array module (or the Storage Pool module), for writing the one or more stripes. In Step S09, the Flash Array module can perform stripe write to respective disks (e.g. the SSD group of the active node, such as the SSD group 12A in this embodiment). For example, as the Compression Engine has performed the compression function in Step S06, 4 KB space contains respective compressed data of multiple SLBA.

After performing the operations of Step S01-S09 as shown in FIG. 5, the active node can transmit associated management information to the standby node to update the management information in the standby node, in order to make the standby node be capable of replacing the active node to continue providing the storage service of the AFA server 100 for the users when there is a need. For example, in Step S10, the Volume Manager module of the active node can synchronize (e.g. update and transmit) a remapping table of the Volume Manager module to the standby node memory (e.g. the memory of the standby node), for controlling (e.g. generating, updating, etc.) some mapping relationships managed by the Volume Manager module. In Step S11, the Flash Array module of the active node can issue a remapping table update command to the standby node Flash Array (e.g. the Flash Array module of the standby node), to update a remapping table of the Flash Array module to the standby node memory (e.g. the memory of the standby node), for controlling (e.g. generating, updating, etc.) some mapping relationships managed by the Flash Array module. While the active node is capable of performing these operations in response to the write request as described above, the active node is capable of performing associated operations in response to the read request to recover the data, for example, according to the mapping relationships respectively managed by the Volume Manager module and the Flash Array module, where some implementation details regarding managing these mapping relationships will be described in some of the subsequent embodiments.

As shown in the upper half of FIG. 5, with the aid of software emulation, any node (e.g. each node) of the nodes 100A and 100B may comprise an emulated persistent memory (which may be referred to as PMem for brevity) based on another node of the multiple nodes, where the PMem can operate on the NTB path, and therefore can be regarded as the NTB based PMem. For example, the any node such as the node 100A can play the role of the active node and the other node such as the node 100B can play the role of the standby node. When a power failure of the main power source of the active node (e.g. the power failure of both of the respective main power sources of the nodes 100A and 100B) occurs, the active node can flush existing information (e.g. buffered data, management table, etc.) in the DRAM thereof into both of an internal non-volatile memory (NVM) storage device (e.g. the C2F SSD of the active node, such as the C2F SSD 122A in this embodiment) and the PMem. More particularly, as each of the nodes is equipped with its own internal NVM storage device(s) and PMem, the standby node can flush the existing information flushed from the active node (e.g. the buffered data, the management table, etc. flushed from the active node) in the DRAM thereof into an internal NVM storage device (e.g. the C2F SSD of the standby node, such as the C2F SSD 122B in this embodiment).

For the active node, although the DRAMs 120A and 120B in the NTB based PMem are volatile memories, the AFA server 100 can utilize the NTB based PMem as a persistent memory with the aid of software emulation, since the standby node that is operating under control of the Write Buffer module thereof can protect any existing information flushed from the active node. When the power failure occurs, the active node can flush the existing information in the DRAM thereof into the internal NVM storage device such as one of multiple NVM storage devices conforming to M.2 specification, and can flush the existing information in the DRAM thereof into the PMem by sending the existing information to the DRAM of the standby node through the NTB path. As a result, the standby node can flush the existing information in the DRAM thereof into the internal NVM storage device thereof (e.g. one of multiple NVM storage devices conforming to M.2 specification).

According to some embodiments, the nodes 100A and 100B can exchange the roles of the active node and the standby node, and can perform the respective operations of the nodes 100B and 100A as described above. For brevity, similar descriptions for these embodiments are not repeated in detail here.

According to some embodiments, in the high availability (HA) architecture implemented with the AFA server 100, the two nodes 100A and 100B such as the active node and the standby node may interact with each other to exchange the node information through the BMC path and the NTB path. More particularly, any node (e.g. each node) of the two nodes 100A and 100B may comprise one or more storage devices installed at the main circuit (e.g. the main circuit board having some hardware (HW) components thereon, as mentioned in the embodiment shown in FIG. 1 and some associated embodiments), such as one or more non-volatile memory (NVM) storage devices comprising NVM (e.g. Flash memory). In a situation where the NVM storage device count of the one or more NVM storage devices is greater than one, the one or more NVM storage devices may comprise multiple NVM storage devices such as that mentioned above. For example, the one or more NVM storage devices may conform to M.2 specification and may be implemented as one or more internally mounted expansion cards of this node, but the present invention is not limited thereto. In addition, when power failure occurs, one or more lower layers such as the SSDs in the AFA of the node may become unavailable, the main circuit of the node, as well as the HW components (e.g. the processor, the DRAM, the BMC, the registers, etc.) of this main circuit, may operate using power of the backup power source (e.g. the battery) of the main circuit, and the node (e.g. software modules running on the processor, such as the program modules 112A or 112B) may perform a C2F operation to save any information to be protected, such as buffered data, etc. temporarily stored in the DRAM of the node and the node information, etc. temporarily stored in the registers of the register circuit of the node, into the one or more NVM storage devices to prevent data loss. For example, the C2F SSD of the node may comprise the one or more NVM storage devices conforming to the M.2 specification.

Figure 6:
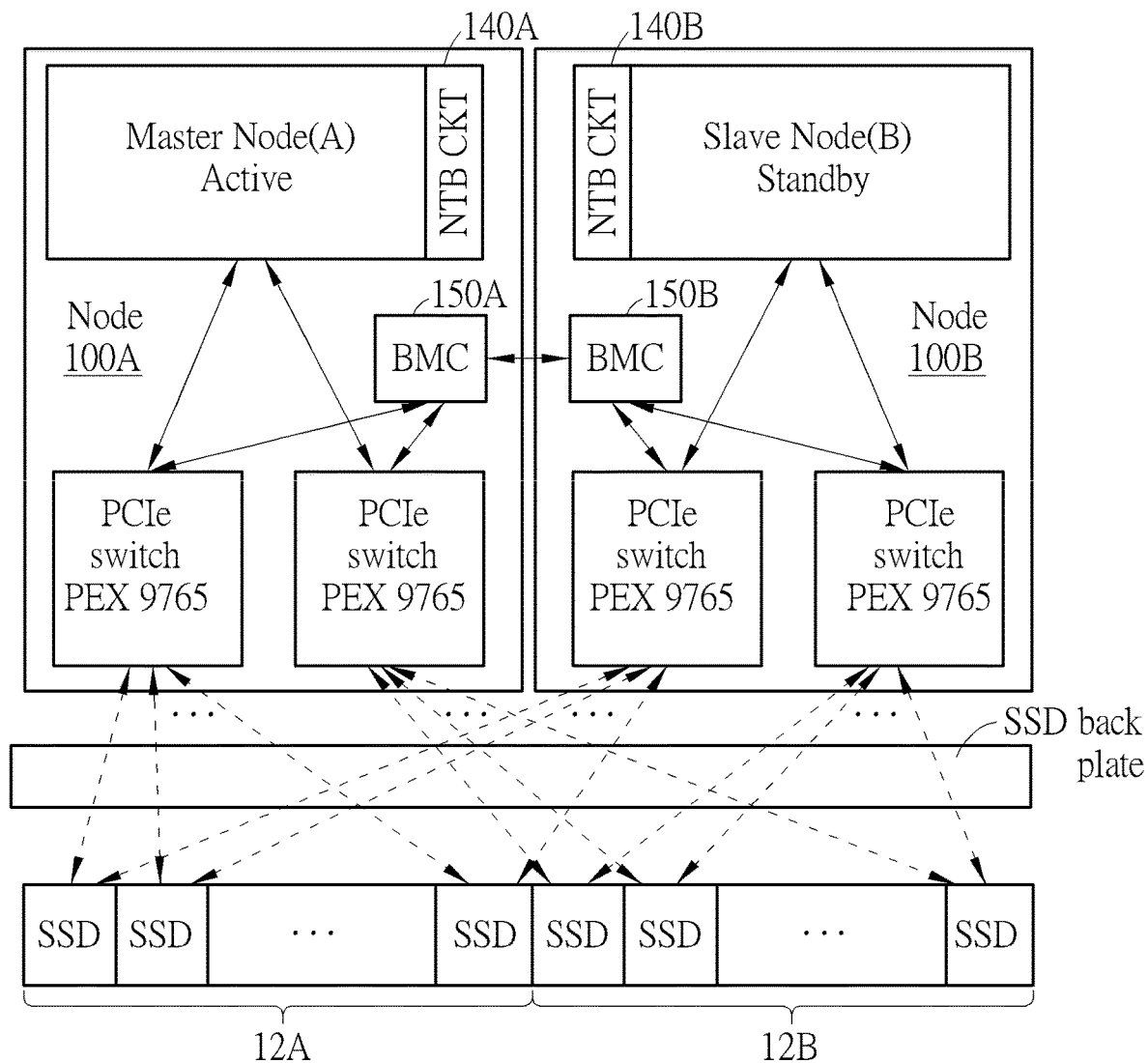
FIG. 6 illustrates a disk switching control scheme of the method for performing disk management of the AFA server according to an embodiment of the present invention.

FIG. 6 illustrates a disk switching control scheme of the method for performing disk management of the AFA server according to an embodiment of the present invention. According to this embodiment, the two nodes 100A and 100B may be regarded as a master node and a slave node, respectively, where the master node may represent the node that is closer to the power supply of the AFA server 100 among the two nodes 100A and 100B, and the slave node may represent the other of the two nodes 100A and 100B. For example, the master node and the slave node may respectively play the roles of the active node and the standby node by default. As shown in FIG. 6, the storage interface circuits 162A and 164A of the node 100A and the storage interface circuits 162B and 164B of the node 100B can be implemented with PCIe switch circuits named PEX 9765 (labeled "PCIe switch PEX 9765" for brevity), and the backplane circuit 100R can be implemented to be the SSD back plate in this embodiment. Any of these PCIe switch circuits may also be referred to as 9765 for brevity.

In any node (e.g. each node) of the two nodes 100A and 100B, the processor running the program modules (e.g. one of the blocks respectively labeled "Master Node(A) Active" and "Slave Node(B) Standby") may control the AFA through one or more switch circuits (e.g. one or more of these PCIe switch circuits) and a connection circuit (e.g. the SSD back plate), and the BMC may control the AFA by itself through the one or more switch circuits and the connection circuit. For better comprehension, the AFA may represent the array of SSDs of a certain SSD group among the SSD groups 12A and 12B under control of the AFA system (e.g. AFA software/program module such as the Storage Control Module of the corresponding node of the two nodes 100A and 100B shown in FIG. 3). For example, in the node 100A, the processor 110A running the program modules 112A (e.g. "Master Node(A) Active") may control the AFA through one or more PCIe switch circuits thereof and the SSD back plate. For another example, in the node 100B, the processor 110B running the program modules 112B (e.g. "Slave Node(B) Standby") may control the AFA through one or more PCIe switch circuits thereof and the SSD back plate.

According to some embodiments, the hardware layer of the any node (e.g. each node) of the two nodes 100A and 100B can provide a hardware (HW) function for performing switching control. Taking the architecture shown in FIG. 6 as an example, a working flow regarding the disk switching control may comprise:

(1) the node 100B utilizes the BMC 150B of the hardware layer of the node 100B to communicate with a corresponding BMC (e.g. the BMC 150A) of a corresponding hardware layer of a remote node (e.g. the node 100A) among the multiple nodes such as the two nodes 100A and 100B to power off the remote node, for disconnecting any possible link between a target SSD group (e.g. one of two SSD groups 12A and 12B) and the remote node;

(2) the node 100B utilizes the BMC 150B to select a clock multiplexer (MUX) in the hardware layer of the node 100B, for performing clock multiplexing corresponding to a set of target disk switching paths between the node 100B and the target SSD group;

(3) the node 100B utilizes the BMC 150B to enable respective SSD reset signals {PERST} of the target SSD group; and (4) the node 100B utilizes the operating system (OS) among the program modules 112B running on the node 100B to enable downstream ports of a target storage interface circuit among the storage interface circuits 162B and 164B of the node 100B, such as multiple communication ports respectively coupled to the target SSD group;

wherein the first three operations of the above operations of this working flow correspond to the HW function, but the present invention is not limited thereto. For example, the two nodes 100A and 100B can be exchanged in the above operations of this working flow.

According to this embodiment, each node of the nodes 100A and 100B can be protected with a Redundant Array of Independent Disks (RAID) level 6 (RAID-6) configuration, where the respective Flash Array modules of the nodes 100A and 100B can perform stripe write or stripe read according to the RAID-6 configuration, but the present invention is not limited thereto. In addition, the target SSD group can be implemented as RAID, and therefore can be regarded as a RAID group.

Figure 7:
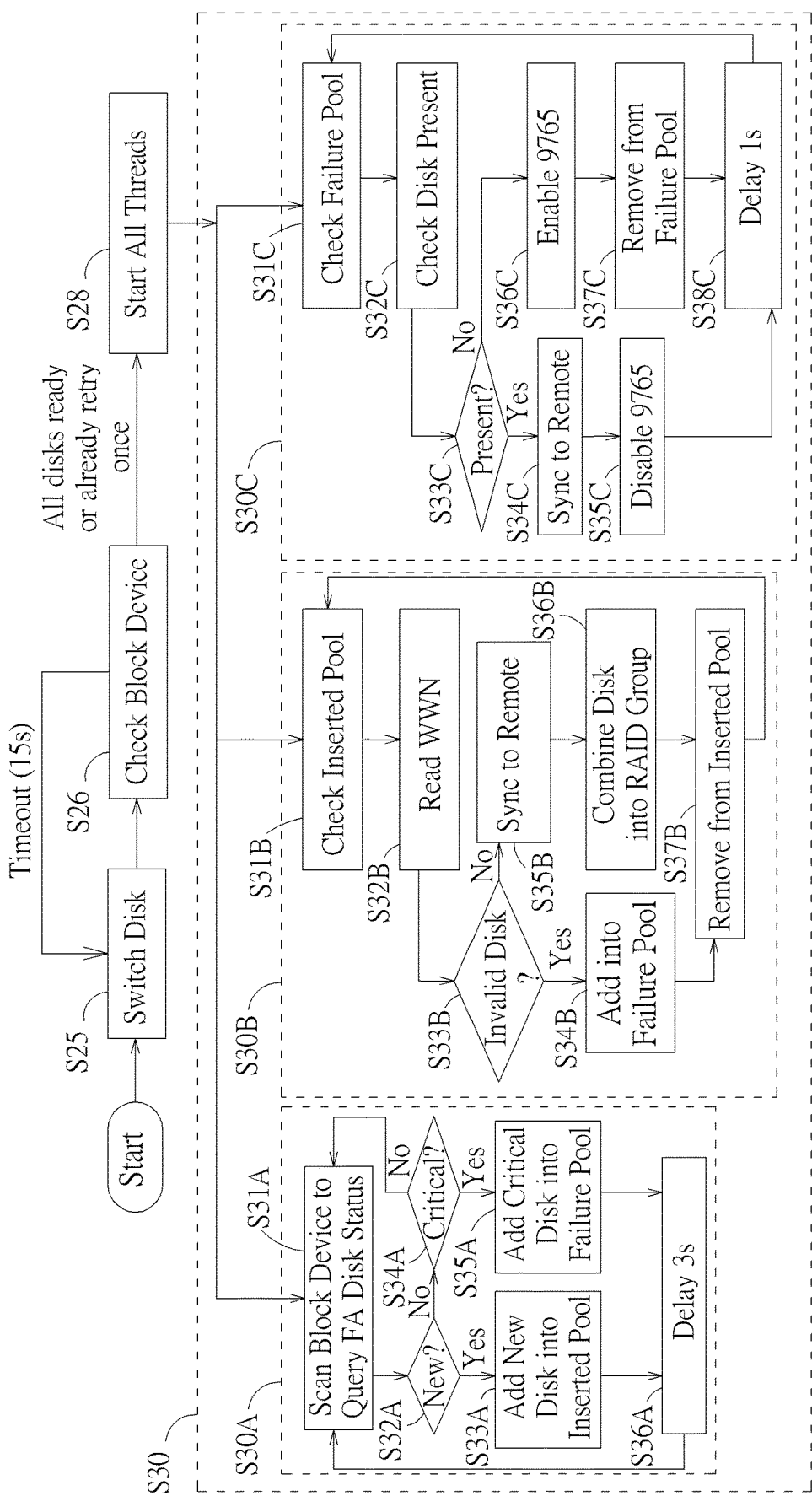
FIG. 7 illustrates a multi-pool control scheme of the method for performing disk management of the AFA server according to an embodiment of the present invention.

FIG. 7 illustrates multi-pool control scheme of the method for performing disk management of the AFA server according to an embodiment of the present invention. When there is a need, the any node (e.g. each node) of the two nodes 100A and 100B can prepare to link to a group of SSDs such as the target SSD group, and manage this group of SSDs. Under control of the program modules running on the processor of the node, the node can be configured to manage multiple disk pools to perform the disk management. For example, the multiple disk pools comprise an active disk pool, and further comprise an inserted disk pool and a failure disk pool (respectively labeled "Inserted Pool" and "Failure Pool" for brevity). According to some viewpoints, the inserted disk pool and the failure disk pool can also be referred to as new disk pool and bad disk pool, respectively.

In Step S25, the any node (e.g. each node) of the two nodes 100A and 100B can utilize a disk manager module (which can be referred to as "disk manager" for brevity) among the program modules running on the node to trigger the hardware layer of the node to perform the aforementioned disk switching control in the HA architecture of the AFA server 100 (e.g., by calling the HW function to perform the three operations corresponding to the HW function), for controlling the node to enable a set of disk switching paths between the node and the target SSD group among four sets of disk switching paths between the two nodes 100A and 100B and the two SSD groups 12A and 12B. Taking the architecture shown in FIG. 6 as an example, the four sets of disk switching paths can be implemented to be four sets of communications paths (illustrated with dashed lines in FIG. 6) split from the four PCIe switch circuits (labeled "PCIe switch PEX 9765" in FIG. 6), respectively. For example, the disk manager module can be configured to run on the OS and utilize the OS to enable the downstream ports of the target storage interface circuit coupled to the target SSD group, but the present invention is not limited thereto.

In Step S26, the node can utilize the disk manager module to check block devices such as the target SSD group (e.g. the SSDs therein). For example, the disk manager module can wait for all SSDs of the target SSD group being ready (labeled "All disks ready" for brevity) until timeout. If a waiting time reaches a waiting time threshold such as 15 seconds (s) (labeled "Timeout (15 s)" for brevity), Step S25 is entered; otherwise, if all SSDs are ready or the disk manager module has already retry once by re-entering Step S25, Step S28 is entered.

According to this embodiment, the disk manager module can be implemented in a multi-thread manner. For example, the disk manager module running on the node comprises multiple threads such as threads #0, #1, #2, #3, etc., where thread #0 can be regarded as a main thread. The main thread running on the node, such as thread #0, can control operations of the disk manager module since the disk manager module starts running on the node, and more particularly, can perform the operations of Steps S25, S26 and S28.

In Step S28, the disk manager module (e.g. thread #0) can start all threads corresponding to respective management of the multiple disk pools (e.g. the active disk pool, the inserted disk pool and the failure disk pool), such as all of at least three threads #1, #2, and #3, for performing multiple groups of operations shown in Step S30 to manage the active disk pool, the inserted disk pool, and the failure disk pool, respectively.

In Step S30, the node can utilize the disk manager module (e.g. threads #1, #2, and #3) to perform the multiple groups of operations respectively corresponding to the multiple disk pools in a parallel processing manner, for managing the target SSD group with the multiple disk pools. For example, Step S30 may comprise multiple sub-steps such as Steps S30A, S30B and S30C, and more particularly, may comprise parallel processing of Steps S30A, S30B and S30C, and the multiple groups of operations may comprise a first group of operations (e.g. operations of Step S30A) corresponding to the active disk pool, a second group of operations (e.g. operations of Step S30B) corresponding to the inserted disk pool, and a third group of operations (e.g. operations of Step S30C) corresponding to the failure disk pool.

In Step S30A, the disk manager module (e.g. thread #1) can perform the first group of operations corresponding to the active disk pool, to manage multiple active SSDs in the active disk pool. For better comprehension, the active disk pool may represent a disk pool for managing all detectable SSDs (e.g. all SSDs that can be scanned or detected by the node) in the target SSD group, and the active SSDs may represent these detectable SSDs (e.g. these SSDs that can be scanned or detected by the node), and therefore, the active disk pool can also be referred to as all disk pool.

In Step S31A, the disk manager module (e.g. thread #1) can scan block devices such as all existing SSDs in the target SSD group to query Flash Array (FA) disk status such as the status of any SSD of the aforementioned AFA (labeled "Scan Block Device to Query FA Disk Status" for brevity), for example, by detecting Self-Monitoring, Analysis and Reporting Technology (SMART) information of this SSD. As Step S31A can be executed multiple times in one or more loops of Step S30A, the disk manager module (e.g. thread #1) can scan all existing SSDs in the target SSD group to monitor these SSDs one by one, and more particularly, monitor them repeatedly.

In Step S32A, the disk manager module (e.g. thread #1) can check whether any new disk such as any new SSD is added into the target SSD group. If Yes, Step S33A is entered; if No, Step S34A is entered.

In Step S33A, the disk manager module (e.g. thread #1) can add the any new disk such as the any new SSD into the inserted disk pool.

In Step S34A, the disk manager module (e.g. thread #1) can check whether any critical disk such as any critical SSD (e.g. any bad SSD, any SSD that is extremely ill and at risk of death, etc.) exists in the target SSD group. If Yes, Step S35A is entered; if No, Step S31A is entered.

In Step S35A, the disk manager module (e.g. thread #1) can add the any critical disk such as the any critical SSD into the failure disk pool.

In Step S36A, the disk manager module (e.g. thread #1) can wait for a while, for example, by delaying 3 seconds (labeled "Delay 3*s*" for brevity). For example, by waiting for a while in Step S36A, the disk manager module can make the any new disk such as the any new SSD in the inserted disk pool be properly processed with the second group of operations (e.g. operations of Step S30B) and/or make the any critical disk such as the any critical SSD in the failure disk pool be properly processed with the third group of operations (e.g. operations of Step S30C) during parallel processing of Step S30. Afterward, Step S31A is entered to process the next SSD in the active disk pool.

In Step S30B, the disk manager module (e.g. thread #2) can perform the second group of operations corresponding to the inserted disk pool, to manage any inserted SSD in the inserted disk pool, where the any inserted SSD represents the any new SSD added into the target SSD group.

In Step S31B, the disk manager module (e.g. thread #2) can check the inserted disk pool to select the any inserted SSD among one or more inserted SSDs (if exist) in the inserted disk pool.

In Step S32B, the disk manager module (e.g. thread #2) can read a World Wide Name (WWN) of the any inserted SSD. For example, the WWN may comprise an identifier (ID) code (e.g. manufacturer name, serial number (S/N), etc.) of this SSD.

In Step S33B, the disk manager module (e.g. thread #2) can check whether the any inserted SSD is an invalid disk such as any invalid SSD according to one or more predetermined lists (e.g. a whitelist and/or a blacklist) of the AFA server 100. If Yes (e.g. this SSD is not in the whitelist and/or is in the blacklist), Step S34B is entered; if No (e.g. this SSD is in the whitelist and/or is not in the blacklist), Step S35B is entered.

In Step S34B, the disk manager module (e.g. thread #2) can add the any inserted SSD (which has just been determined as the invalid disk) into the failure disk pool.

In Step S35B, the disk manager module (e.g. thread #2) can synchronize (sync) the latest status of the any inserted SSD (which has just been determined as a valid disk rather than the invalid disk) to the remote node (e.g. the other node among the two nodes 100A and 100B) for updating the HA disk table at the remote side (labeled "Sync to Remote" for brevity). The HA disk table can store respective status of SSDs in the HA architecture, and the two nodes 100A and 100B can maintain their own versions of the HA disk table, respectively, and try making these versions of the HA disk table be updated and be equal to each other when any change occurs, for example, by updating one of these versions of the HA disk table according the other of these versions of the HA disk table as soon as possible.

In Step S36B, the disk manager module (e.g. thread #2) can utilize the AFA system to combine the any inserted SSD in the inserted disk pool into the RAID group of the AFA mentioned above (labeled "Combine Disk into RAID Group" for brevity).

In Step S37B, the disk manager module (e.g. thread #2) can remove the any inserted SSD from inserted disk pool. Afterward, Step S31B is entered to process the next SSD (if exists) in the inserted disk pool.

In Step S30C, the disk manager module (e.g. thread #3) can perform the third group of operations corresponding to the failure disk pool, to manage any failure SSD in the failure disk pool, where the any failure SSD may represent any critical or invalid SSD (e.g. any bad SSD, any SSD that is extremely ill and at risk of death, any SSD in a blacklist of the AFA server 100, any SSD that is not in a whitelist of the AFA server 100, etc.) needing being removed from the target SSD group.

In Step S31C, the disk manager module (e.g. thread #3) can check the failure disk pool to select the any failure SSD among one or more failure SSDs (if exist) in the failure disk pool.

Among the two storage interface circuits of the node (e.g. the storage interface circuits 162A and 164A such as the two PCIe switch circuits at the left-hand side of FIG. 6, or the storage interface circuits 162B and 164B such as the two PCIe switch circuits at the right-hand side of FIG. 6), a certain storage interface circuit of the hardware layer of the node can be configured to provide the set of disk switching paths mentioned in the operation of Step S25, depending on which SSD group of the two SSD groups 12A and 12B is the target SSD group. In Steps S32C and S33C, the disk manager module (e.g. thread #3) can utilize the BMC of the hardware layer of the node to check whether the any failure SSD is present, for adaptively disabling or enabling a certain port corresponding to the any failure SSD (e.g. the port for coupling the node to the any failure SSD) among multiple ports of the storage interface circuit according to whether the any failure SSD is present in some subsequent steps.

In Step S32C, the disk manager module (e.g. thread #3) can check plug-in detection information regarding the any failure SSD for determining whether the any failure SSD is present or not (labeled "Check Disk Present" for brevity), for example, by obtaining a sensor/detector status regarding the any failure SSD via the BMC of the node, where the BMC can collect or monitor the sensor/detector status from a sensor/detector of the sensors/detectors of the node. For example, before the any failure SSD is removed from the corresponding slot among multiple slots for installing the target SSD group, the plug-in detection information may indicate that the any failure SSD is present. For another example, when the any failure SSD has been removed from the corresponding slot, the plug-in detection information may indicate that the any failure SSD is not present.

In Step S33C, the disk manager module (e.g. thread #3) can determine whether the any failure SSD is present (e.g. at the slot) or not according to the plug-in detection information. If Yes, Step S34C is entered; if No, Step S36C is entered.

In Step S34C, in response to the any failure SSD being present, the disk manager module (e.g. thread #3) can synchronize (sync) the latest status of the any failure SSD to the remote node (e.g. the other node among the two nodes 100A and 100B) for updating the HA disk table at the remote side (labeled "Sync to Remote" for brevity).

In Step S35C, in response to the any failure SSD being present, the disk manager module (e.g. thread #3) can temporarily disable the port corresponding to the any failure SSD among the multiple ports of the storage interface circuit (labeled "Disable 9765" for better comprehension) to prevent occurrence of any revival behavior of the any failure SSD, in order to forbid any misjudgment of any of the program modules running on the node due to the any revival behavior.

As shown in FIG. 7, a partial working flow comprising Steps S31C-S33C can be performed multiple times to generate multiple checking results, respectively. For example, the multiple checking results comprises a first checking result indicating that the any failure SSD is present, and a second checking result indicating that the any failure SSD is not present. Steps S34C, S35C and S38C can be performed subsequently in response to the first checking result, and Steps S36C-S38C can be performed subsequently in response to the second checking result.

In Step S36C, in response to the any failure SSD being not present, the disk manager module (e.g. thread #3) can enable the port corresponding to the any failure SSD (labeled "Enabling 9765" for better comprehension), where the second checking result (e.g. the any failure SSD being not present) is generated after the any failure SSD is removed from the target SSD group.

In Step S37C, after enabling the port corresponding to the any failure SSD, the disk manager module (e.g. thread #3) can remove the any failure SSD from the failure disk pool, to allow further detection regarding the any inserted SSD at the port corresponding to the any failure SSD.

In Step S38C, the disk manager module (e.g. thread #3) can wait for a while, for example, by delaying 1 second (labeled "Delay 1s" for brevity). For example, by waiting for a while in Step S38C, the disk manager module can enhance overall performance by reducing unnecessary loading of the operation of Step S30C, since the any failure SSD may be determined in any of Steps S30A and 530B. Afterward, Step S31C is entered to process the next SSD (if exists) in the failure disk pool.

Among the multiple disk pools, the inserted disk pool and the failure disk pool can be empty by default. For example, when the any inserted SSD is determined in Step S30A, the inserted disk pool becomes non-empty and needs processing of Step S30B. For another example, when the any failure SSD is determined in any of Steps S30A and 530B, the failure disk pool becomes non-empty and needs processing of Step S30C.

For better comprehension, the method may be illustrated with the working flow shown in FIG. 7, but the present invention is not limited thereto. According to some embodiments, one or more steps may be added, deleted, or changed in the working flow shown in FIG. 7.

According to some embodiments, the at least three threads #1, #2 and #3 can play the roles of at least three pollers #1, #2 and #3, respectively, for monitoring (e.g. polling) respective status of the multiple disk pools to manage the multiple disk pools, respectively. For example, the thread #1 running on the node can be configured to act as the poller #1 to monitor the active disk pool and manage the active disk pool according to monitoring results of the active disk pool, the thread #2 running on the node can be configured to act as the poller #2 to monitor the inserted disk pool and manage the inserted disk pool according to monitoring results of the inserted disk pool, and the thread #3 running on the node can be configured to act as the poller #3 to monitor the failure disk pool and manage the failure disk pool according to monitoring results of the failure disk pool.

According to some embodiments, under control of the software layer (e.g. the software modules, such as the HA Framework module, etc.), the any node (e.g. each node) of the two nodes 100A and 100B can be configured to determine the role of the node.

Figure 8:
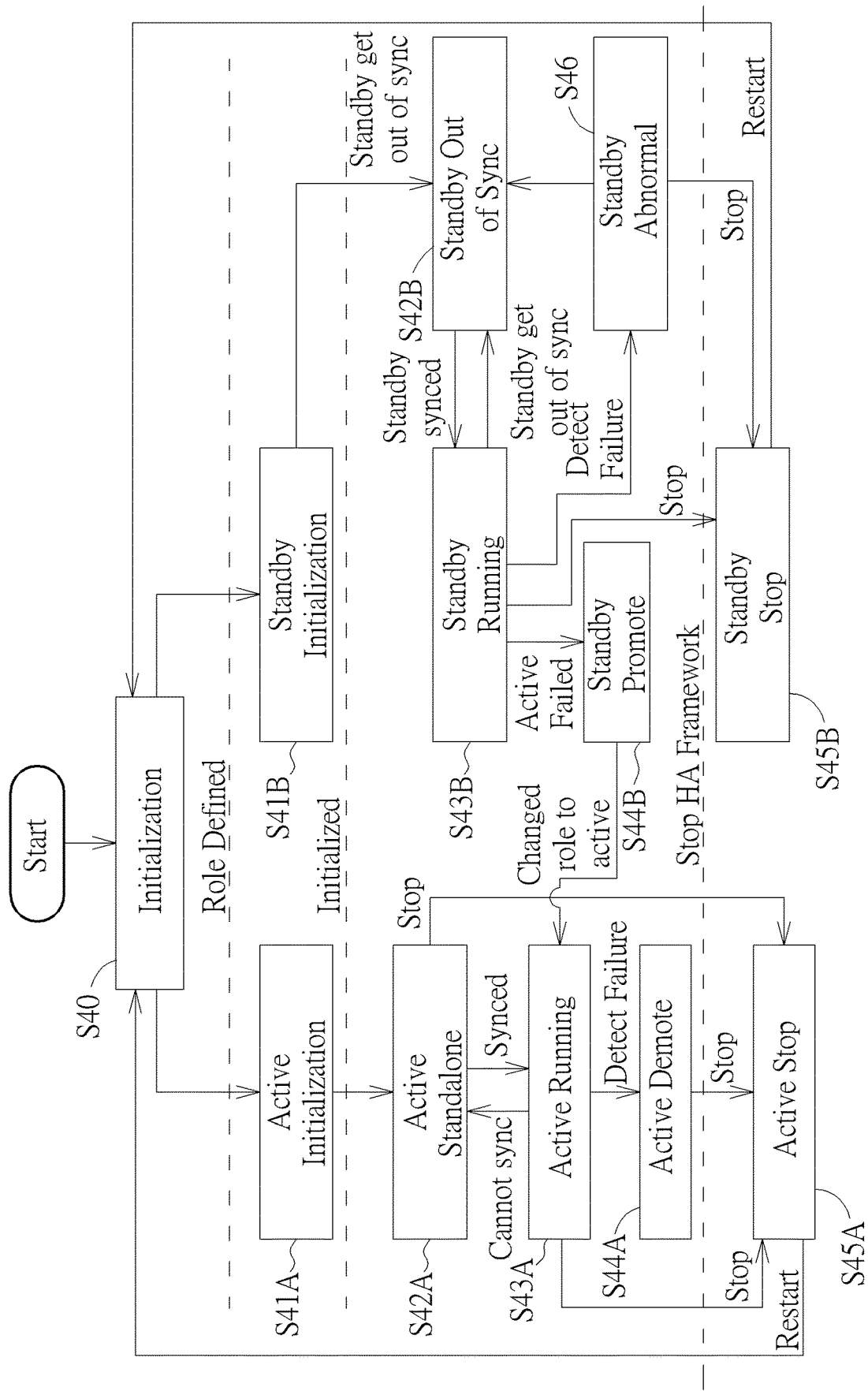
FIG. 8 illustrates a role and status transition control scheme of the method for performing disk management of the AFA server according to an embodiment of the present invention.

FIG. 8 illustrates a role and status transition control scheme of the method for performing disk management of the AFA server according to an embodiment of the present invention. Under control of the software layer (e.g. the software modules, such as the HA Framework module, etc.), the any node (e.g. each node) of the two nodes 100A and 100B can be configured to perform role and status transition control according to the role and status transition control scheme.

In Step S40, the node may perform initialization (e.g. the initialization of the system of the node).

In Step S41A, after the role of the node has been defined to be the active node, the node may perform active initialization (e.g. the initialization related to the role of the active node).

In Step S41B, after the role of the node has been defined to be the standby node, the node may perform standby initialization (e.g. the initialization related to the role of the standby node).

In Step S42A, after the node such as the active node has been initialized, the node may operate in the Standalone status of the role of the active node (labeled "Active Standalone" for brevity).

In Step S42B, after the node such as the standby node has been initialized, the node may operate in the Out of Sync status of the role of the standby node (labeled "Standby Out of Sync" for brevity), since the standby node may get out of synchronization with respect to the active node at this moment (labeled "Standby get out of sync" for brevity).

In Step S43A, when the node such as the active node has synchronized (synced) the latest data stored in the active node to the standby node, the node such as the active node may operate in the Running status of the role of the active node (labeled "Active Running" for brevity). For example, when the node such as the active node cannot synchronize (sync) the latest data stored in the active node to the standby node, Step S42A is entered.

In Step S43B, when the node such as the standby node has synchronized (synced) the latest data from the active node to make the data stored in the standby node be equivalent to the latest data stored in the active node, the node may operate in the Running status of the role of the standby node (labeled "Standby Running" for brevity). For example, when the standby node gets out of synchronization with respect to the active node (labeled "Standby get out of sync" for brevity), Step S42B is entered.

In Step S44A, when the node such as the active node detects failure thereof, the node may operate in the Demote status of the role of the active node (labeled "Active Demote" for brevity).

In Step S44B, when detecting that the active node failed (labeled "Active Failed" for brevity), the node such as the standby node may operate in the Promote status of the role of the standby node (labeled "Standby Promote" for brevity). As shown in FIG. 8, the arrow pointing toward Step S43A from Step S44B indicates that, when the node such as the standby node has changed the role thereof to the role of the active node (labeled "Changed role to active" for brevity), this node becomes the latest active node among the two nodes 100A and 100B.

In Step S45A, when the node such as the active node stops working (e.g. the node may stop the HA Framework module thereof), the node may enter the Stop status of the role of the active node (labeled "Active Stop" for brevity), where the node stops the service thereof. Afterward, the node may restart automatically.

In Step S45B, when the node such as the standby node stops working (e.g. the node may stop the HA Framework module thereof), the node may enter the Stop status of the role of the standby node (labeled "Standby Stop" for brevity), where the node stops the service thereof. Afterward, the node may restart automatically.

In Step S46, when the node such as the standby node detects failure thereof, the node may operate in the Abnormal status of the role of the standby node (labeled "Standby Abnormal" for brevity). For example, if the node such as the standby node stops working (e.g. the node may stop the HA Framework module thereof), Step S45B is entered; otherwise, Step S42B is entered.

According to some embodiments, the any node (e.g. each node) of the two nodes 100A and 100B can be configured to monitor the status of the node according to the working flow shown in FIG. 8, and more particularly, perform resource management on multiple types of resources of the node. For better comprehension, any component (e.g. software component) managed by the HA Framework module can be referred to as resource. Examples of an action being applied to the resource may include, but are not limited to: Start (e.g. enable), Stop (e.g. disable), Demote (e.g. make the resource become inactive; in particular, for the whole of the node, release or give up the role the active node), Promote (e.g. make the resource become active; in particular, for the whole of the node, change the role thereof from standby to active), C2F (e.g. perform the C2F operation), Set Standalone (e.g. set the node such as the active node to provide service to the user without synchronizing/copying the latest data stored in the active node to the standby node), and Cancel Standalone (e.g. set the node such as the active node to provide service to the user while synchronizing/copying the latest data stored in the active node to the standby node).

Figure 9:
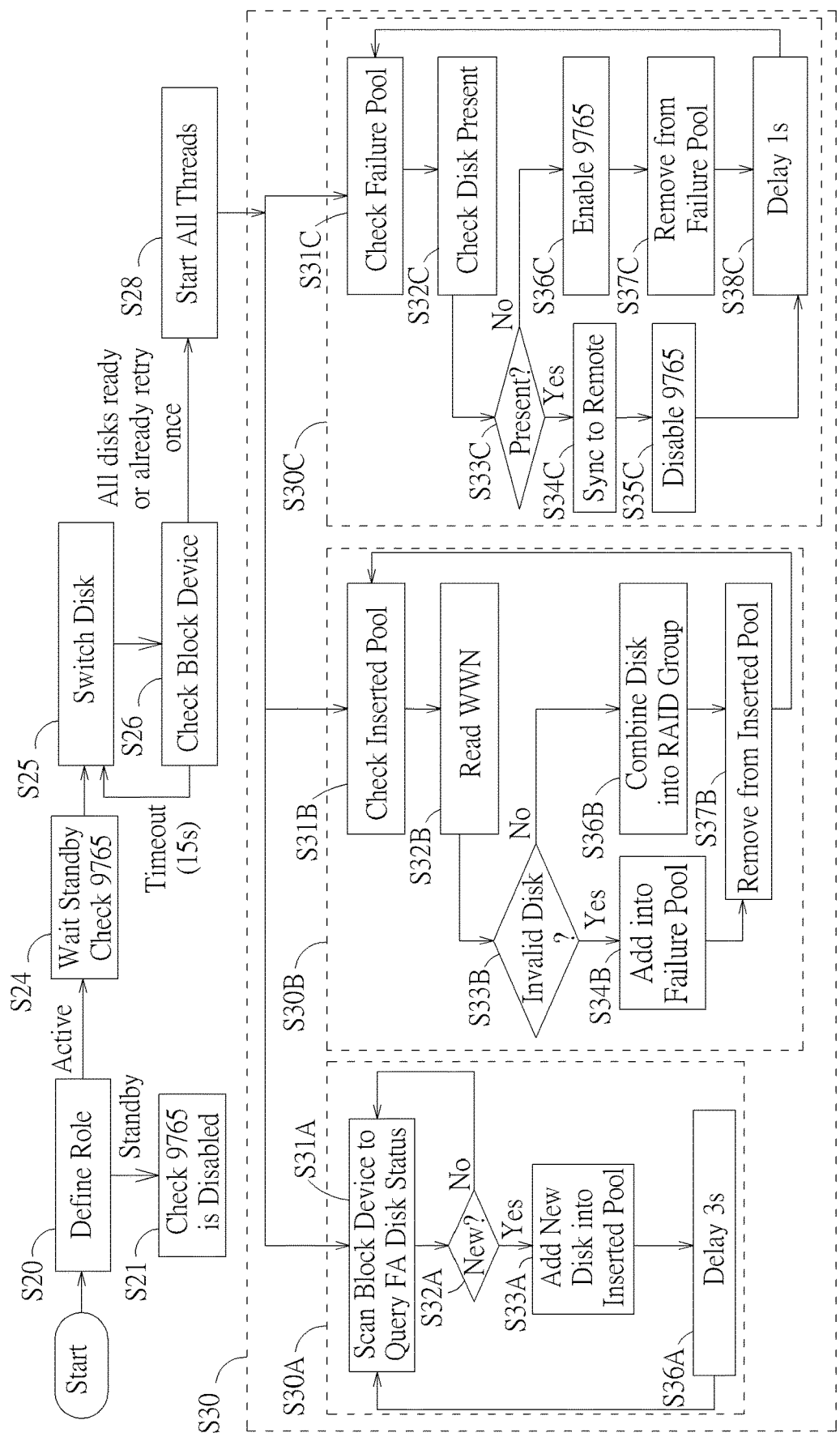
FIG. 9 illustrates the multi-pool control scheme shown in FIG. 7 according to another embodiment of the present invention.

FIG. 9 illustrates the multi-pool control scheme shown in FIG. 7 according to another embodiment of the present invention. In comparison with the working flow shown in FIG. 7, Steps S20, S21 and S24 are added in this embodiment, where Steps S34A, S35A and S35B are removed, and some associated partial working flows are changed correspondingly.

In Step S20, the any node (e.g. each node) of the two nodes 100A and 100B can define the role of the node according to a partial working flow (e.g. a first partial working flow comprising at least Steps S40 and S41A or a second partial working flow comprising at least Steps S40 and S41B) of the working flow shown in FIG. 8. For example, when the node represents the node 100A implemented as the master node, the node can play the role of the active node by default. For another example, when the node represents the node 100B implemented as the slave node, the node can play the role of the standby node by default.

In Step S21, in response to the role of the node being defined as the standby node (labeled "Standby" for brevity), the disk manager module (e.g. thread #0) can check whether each storage interface circuit of the storage interface circuits of the node is disabled, and more particularly, disable any storage interface circuit that has not been disabled among these storage interface circuits (labeled "Check 9765 is Disabled" for better comprehension).

In Step S24, in response to the role of the node being defined as the active node (labeled "Active" for brevity), the disk manager module (e.g. thread #0) can wait for the remote node such as the standby node checking whether each storage interface circuit of the storage interface circuits of the remote node is disabled, and more particularly, wait for the remote node disabling any storage interface circuit that has not been disabled among these storage interface circuits (labeled "Wait Standby Check 9765" for better comprehension). Afterward, Step S25 is entered. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9. For example, the disk manager module (e.g. thread #1) can perform the operations of Steps S34A and S35A as shown in FIG. 7, where Step S30A can be kept the same as that shown in FIG. 7. For another example, the disk manager module (e.g. thread #1) can perform the operations of Steps S34A, S35A and S35B as shown in FIG. 7, where Steps S30A and 530B can be kept the same as that shown in FIG. 7. For yet another example, the disk manager module (e.g. thread #1) can perform the operation of Step S35B as shown in FIG. 7, where Step S30B can be kept the same as that shown in FIG. 7.

Figure 10:
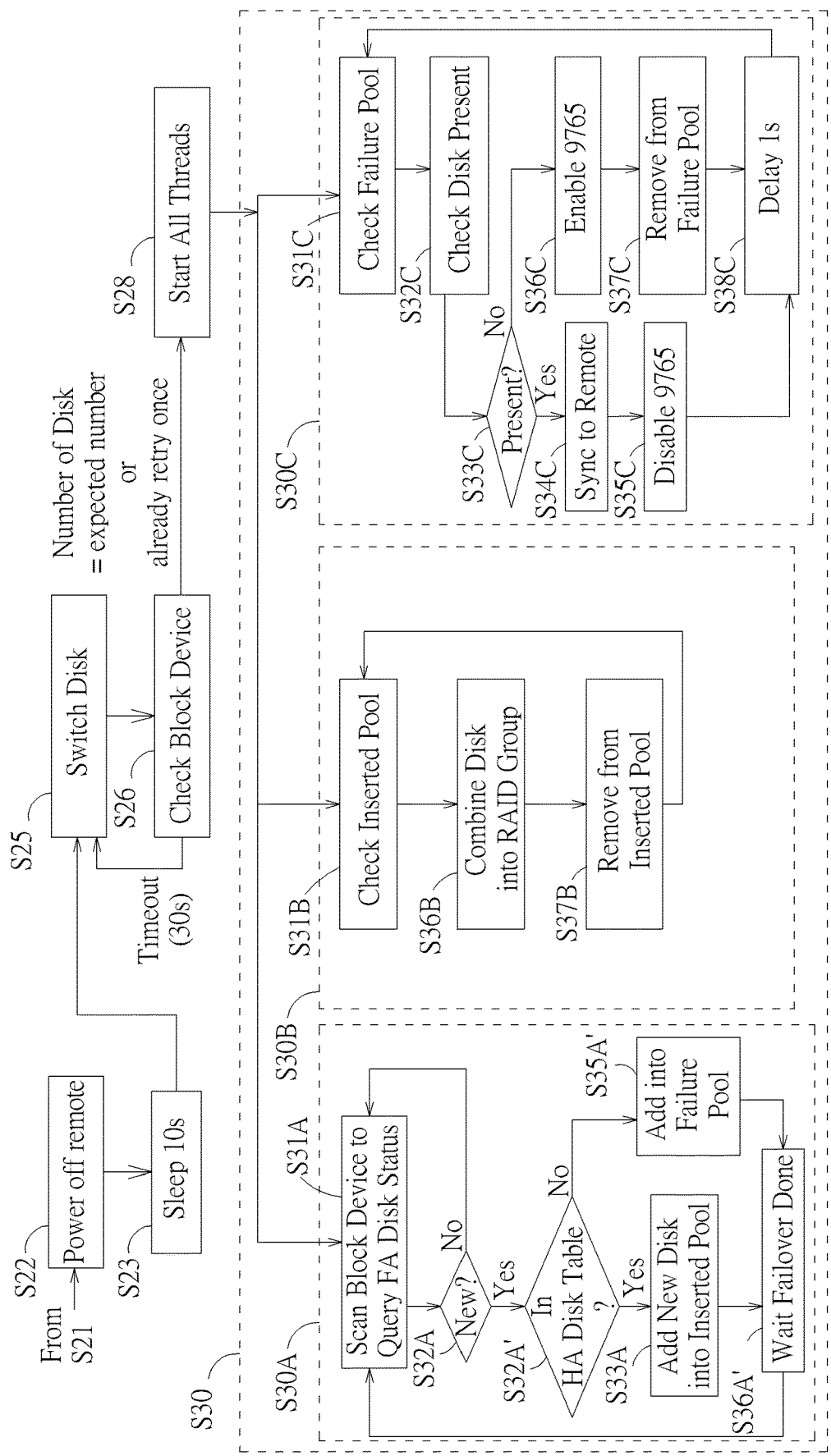
FIG. 10 illustrates a failover control scheme of the method for performing disk management of the AFA server according to an embodiment of the present invention.

FIG. 10 illustrates a failover control scheme of the method for performing disk management of the AFA server according to an embodiment of the present invention. In comparison with the working flow shown in FIG. 7, Steps S22, S23, S32A' and 535A' are added in this embodiment, where Steps S34A, S35A and S32B-S35B are removed, S36A is replaced with S36A', and some associated partial working flows are changed correspondingly. In a situation where the role of the any node (e.g. each node) of the two nodes 100A and 100B is previously defined as the standby node and the node is becoming the latest active node, Step S22 can be entered after the operation of Step S21 shown in FIG. 9 is completed, but the present invention is not limited thereto.

According to some embodiments, one or more steps may be added between Steps S21 and S22.

In Step S22, the disk manager module (e.g. thread #0) can power off the remote node, for example, by utilizing the BMC of the hardware layer of the node to communicate with the corresponding BMC (e.g. the BMC 150A) of the corresponding hardware layer of the remote node.

In Step S23, the disk manager module (e.g. thread #0) can wait for a while, for example, by sleeping during a predetermined sleeping period such as 10 seconds (labeled "Sleep 10s" for brevity). Afterward, Step S25 is entered.

As the operation of Step S22 can be similar to or the same as the first operation of the three operations corresponding to the HW function, in Step S25, the disk manager module (e.g. thread #0) can call the second and the third operations of the three operations corresponding to the HW function to complete the aforementioned disk switching control. Regarding the condition of entering Steps S25 from Step S26 and the condition of entering S28 from Step S26, if the waiting time reaches the waiting time threshold such as 30 seconds (labeled "Timeout (30 s)" for brevity), Step S25 is entered; otherwise, if the number of SSDs in the target SSD group is equal to an expected number as indicated by the HA disk table (labeled "Number of Disk=expected number" for brevity) or the disk manager module has already retry once by re-entering Step S25, Step S28 is entered.

In Step S32A', the disk manager module (e.g. thread #1) can check whether the any new disk such as the any new SSD is in the HA disk table. If Yes, Step S33A is entered; if No, Step S35A' is entered.

In Step S35A', the disk manager module (e.g. thread #1) can add the any new disk such as the any new SSD into the failure disk pool. For example, the operation of Step S35A' can prevent any invalid disk (e.g. invalid SSD) from being forcibly added into the target SSD group by the user during failover.

In Step S36A', the disk manager module (e.g. thread #1) can wait for the failover being done (labeled "Wait Failover Done" for brevity). For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10. For example, Step S34C may be removed from the working flow shown in FIG. 10, and Step S35C may be performed in response to the checking result "Yes" of Step S33C.

Figure 11:
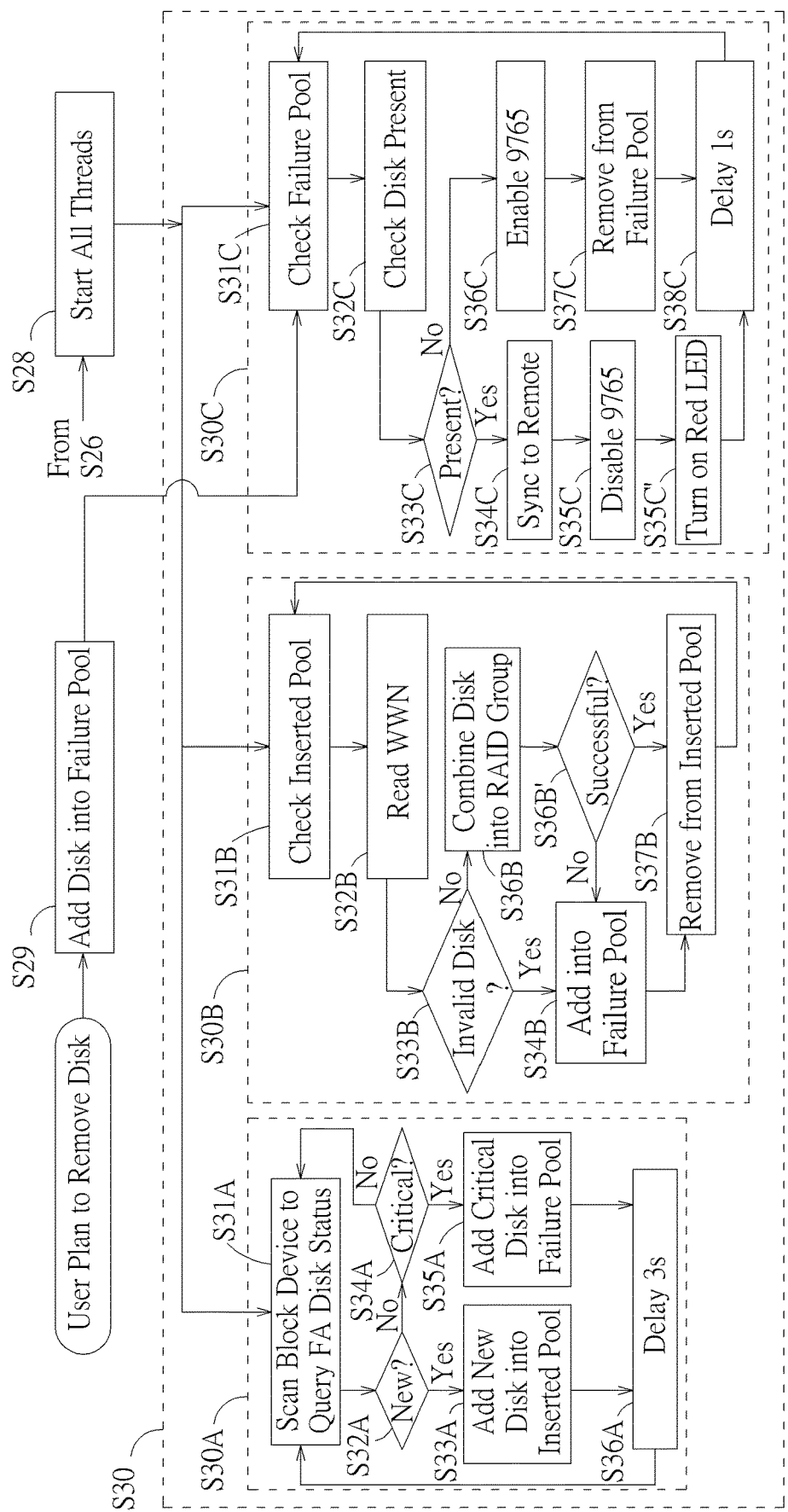
FIG. 11 illustrates a hot-plug control scheme of the method for performing disk management of the AFA server according to an embodiment of the present invention.

FIG. 11 illustrates a hot-plug control scheme of the method for performing disk management of the AFA server according to an embodiment of the present invention. In comparison with the working flow shown in FIG. 7, Steps S29, S36B' and S35C' are added in this embodiment, where Step S35B is removed, and some associated partial working flows are changed correspondingly. Although Steps S25 and S26 are not illustrated, the any node (e.g. each node) of the two nodes 100A and 100B can perform the operations of Steps S25 and S26 as shown in FIG. 7, but the present invention is not limited thereto. According to some embodiments, the node can perform the operations of Steps S20 and S24-S26 as shown in FIG. 9.

The third group of operations (e.g. operations of Step S30C) corresponding to the failure disk pool can be further configured to manage any unwanted SSD in the failure disk pool. When the user of the AFA server 100 plans to remove a certain disk such as a certain SSD in the target SSD group (labeled "User Plan to Remove Disk" for brevity), the disk manager module (e.g. thread #0) can utilize a UI module (e.g. the Web UI module shown in FIG. 4) among the program modules running on the node to obtain a removal instruction from the user, where the removal instruction indicates that removal of the any unwanted SSD is required.

In Step S29, in response to the removal instruction, the node can utilize the disk manager module (e.g. thread #0) to add the any unwanted SSD into the failure disk pool (labeled "Add Disk into Failure Pool" for brevity). Afterward, Step S31C is entered.

In Step S36B', the disk manager module (e.g. thread #2) can check whether the operation of Step S36B is successful (e.g. whether the AFA system has successfully combined the any inserted SSD into the RAID group). If Yes (e.g. the AFA system detects that the any inserted SSD is available/usable in the RAID group), Step S37B is entered; if No (e.g. the AFA system detects that the any inserted SSD is not available/usable in the RAID group), Step S34B is entered.

In Step S30 shown in FIG. 11, the disk manager module (e.g. thread #0) can manage the any unwanted SSD in a similar manner to that of managing the any failure SSD, and more particularly, treat the any unwanted SSD as if it is the any failure SSD, where Step S35C' is inserted between Steps S35C and S38C.

In Step S35C', the disk manager module (e.g. thread #3) can turn on at least one red Light-Emitting Diode (LED) corresponding to the any unwanted SSD (e.g. a red LED of the any unwanted SSD and/or a red LED of the slot where the any unwanted SSD is installed), to indicate the any unwanted SSD being removed.

For better comprehension, the method may be illustrated with the working flow shown in FIG. 11, but the present invention is not limited thereto. According to some embodiments, one or more steps may be added, deleted, or changed in the working flow shown in FIG. 11.

Figure 12:
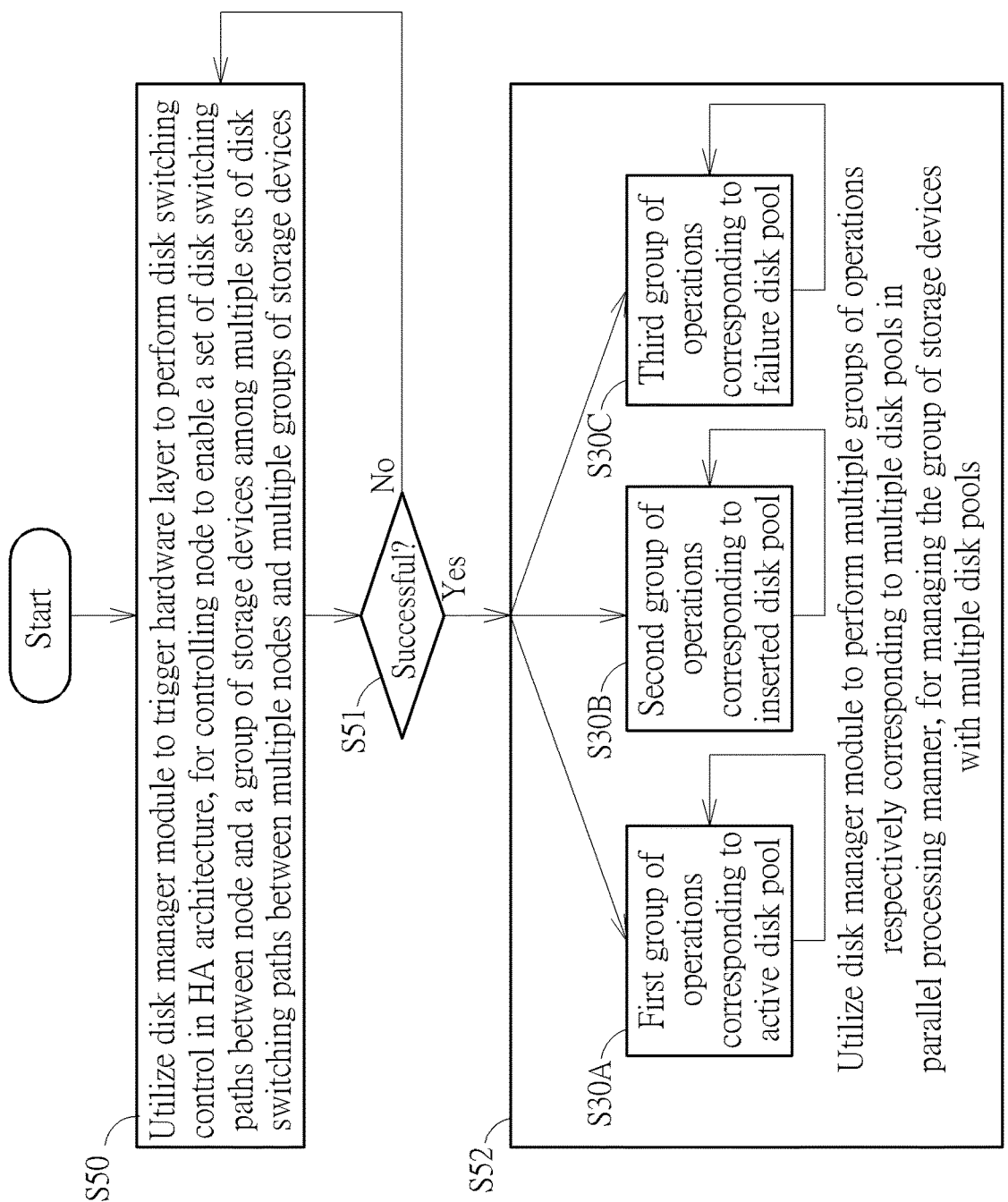
FIG. 12 illustrates a flowchart of the method for performing disk management of the AFA server according to an embodiment of the present invention.

FIG. 12 illustrates a flowchart of the method for performing disk management of the AFA server according to an embodiment of the present invention.

In Step S50, the any node (e.g. each node) of the two nodes 100A and 100B can utilize the disk manager module (e.g. thread #0) to trigger the hardware layer of the node to perform the aforementioned disk switching control in the HA architecture of the AFA server 100 (e.g., by calling the HW function to perform the three operations corresponding to the HW function), for controlling the node to enable a set of disk switching paths between the node and a group of storage devices (e.g. one of the SSD groups 12A and 12B) among multiple sets of disk switching paths between the multiple nodes (e.g. the two nodes 100A and 100B) and multiple groups of storage devices (e.g. the two SSD groups 12A and 12B), such as the set of disk switching paths mentioned in Step S25.

In Step S51, the node can utilize the disk manager module (e.g. thread #0) to check whether the operation of Step S50 is successful (e.g. by performing the operation of Step S26). If Yes, Step S52 is entered; if No, Step S50 is entered.

In Step S52, the node can utilize the disk manager module (e.g. threads #1, #2, and #3) to perform the multiple groups of operations respectively corresponding to the multiple disk pools in the parallel processing manner, for managing the group of storage devices (e.g. the target SSD group) with the multiple disk pools, where the multiple groups of operations may comprise the first group of operations corresponding to the active disk pool, the second group of operations corresponding to the inserted disk pool and the third group of operations corresponding to the failure disk pool, such as the respective operations of Steps S30A-S30C of one or more of the above embodiments. For brevity, similar descriptions for this embodiment are not repeated in detail here.

For better comprehension, the method may be illustrated with the working flow shown in FIG. 12, but the present invention is not limited thereto. According to some embodiments, one or more steps may be added, deleted, or changed in the working flow shown in FIG. 12.

According to some embodiments, the multiple groups of storage devices can be implemented with multiple groups of single port SSDs, respectively, and the group of storage devices can be implemented with a group of single port SSDs among the multiple groups of single port SSDs. The disk manager module can be configured to perform the multiple groups of operations respectively corresponding to the multiple disk pools in the parallel processing manner, for managing the group of single port SSDs with the multiple disk pools, so as to prevent malfunction of any single port SSD among the group of single port SSDs. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing disk management of an all flash array (AFA) server, the method comprising:
utilizing a disk manager module among multiple program modules running on any node of multiple nodes of the AFA server to trigger a hardware layer of the any node to perform disk switching control in a high availability (HA) architecture of the AFA server, for controlling the any node to enable a set of disk switching paths between the any node and a group of storage devices among multiple sets of disk switching paths between the multiple nodes and multiple groups of storage devices, the multiple groups of storage devices comprising the group of storage devices, wherein the multiple groups of storage devices are implemented with multiple groups of solid state drives (SSDs), respectively; and
utilizing the disk manager module to perform multiple groups of operations respectively corresponding to multiple disk pools in a parallel processing manner, for managing the group of storage devices with the multiple disk pools, wherein the multiple disk pools comprise an active disk pool, an inserted disk pool, and a failure disk pool, and the multiple groups of operations comprise:
a first group of operations corresponding to the active disk pool, configured to manage multiple active storage devices in the active disk pool;
a second group of operations corresponding to the inserted disk pool, configured to manage any inserted storage device in the inserted disk pool, wherein the any inserted storage device represents any new storage device added into the group of storage devices; and
a third group of operations corresponding to the failure disk pool, configured to manage any failure storage device in the failure disk pool, wherein the any failure storage device represents any critical or invalid storage device needing being removed from the group of storage devices;
wherein the disk manager module running on the any node comprises at least three threads, and the at least three threads are configured to perform the multiple groups of operations respectively corresponding to the multiple disk pools in the parallel processing manner, for managing the group of storage devices with the multiple disk pools, respectively.

2. The method of claim 1, wherein the disk manager module running on the any node comprises multiple threads, and the multiple threads comprise:
a main thread running on the any node, the main thread being configured to trigger the hardware layer of the any node to perform the disk switching control, for controlling the any node to enable the set of disk switching paths among the multiple sets of disk switching paths, and start the at least three threads among the multiple threads to perform the multiple groups of operations respectively corresponding to the multiple disk pools in the parallel processing manner, for managing the group of storage devices with the multiple disk pools.

3. The method of claim 2, wherein the at least three threads among the multiple threads comprise:
a first thread among the at least three threads, the first thread being configured to perform the first group of operations corresponding to the active disk pool;
a second thread among the at least three threads, the second thread being configured to perform the second group of operations corresponding to the inserted disk pool; and
a third thread among the at least three threads, the third thread being configured to perform the third group of operations corresponding to the failure disk pool.

4. The method of claim 1, wherein the at least three threads comprise:
a first thread running on the any node, the first thread being configured to act as a first poller to monitor the active disk pool;
a second thread running on the any node, the second thread being configured to act as a second poller to monitor the inserted disk pool; and
a third thread running on the any node, the third thread being configured to act as a third poller to monitor the failure disk pool.

5. The method of claim 1, wherein the at least three threads comprise:
a first thread running on the any node, the first thread being configured to monitor the active disk pool and manage the active disk pool according to monitoring results of the active disk pool;
a second thread running on the any node, the second thread being configured to monitor the inserted disk pool and manage the inserted disk pool according to monitoring results of the inserted disk pool; and
a third thread running on the any node, the third thread being configured to monitor the failure disk pool and manage the failure disk pool according to monitoring results of the failure disk pool.

6. The method of claim 1, wherein a storage interface circuit of the hardware layer of the any node is configured to provide the set of disk switching paths; and the third group of operations comprise:
utilizing a Board Management Controller (BMC) of the hardware layer of the any node to check whether the any failure storage device is present;
in response to the any failure storage device being present, temporarily disabling a port corresponding to the any failure storage device among multiple ports of the storage interface circuit to prevent occurrence of any revival behavior of the any failure storage device in order to forbid any misjudgment of any of the multiple program modules running on the any node due to the any revival behavior.

7. The method of claim 6, wherein the step of utilizing the BMC of the hardware layer of the any node to check whether the any failure storage device is present is performed multiple times to generate multiple checking results, respectively, wherein the multiple checking results comprise a first checking result indicating that the any failure storage device is present, and a second checking result indicating that the any failure storage device is not present; the step of temporarily disabling the port corresponding to the any failure storage device is performed in response to the first checking result; and the third group of operations further comprise:
in response to the second checking result, enabling the port corresponding to the any failure storage device, wherein the second checking result is generated after the any failure storage device is removed from the group of storage devices; and
after enabling the port corresponding to the any failure storage device, removing the any failure storage device from the failure disk pool, to allow further detection regarding the any inserted storage device at the port corresponding to the any failure storage device.

8. The method of claim 1, wherein the third group of operations corresponding to the failure disk pool are further configured to manage any unwanted storage device in the failure disk pool; and the method further comprises:
utilizing a user interface (UI) module among the multiple program modules running on the any node to obtain a removal instruction from a user of the AFA server, wherein the removal instruction indicates that removal of the any unwanted storage device is required; and
in response to the removal instruction, utilizing the disk manager to add the any unwanted storage device into the failure disk pool.

9. The method of claim 1, wherein a working flow of the disk switching control comprises:
utilizing a Board Management Controller (BMC) of the hardware layer of the any node to communicate with a corresponding BMC of a corresponding hardware layer of a remote node among the multiple nodes to power off the remote node, for disconnecting any possible link between the group of storage devices and the remote node;
utilizing the BMC to select a clock multiplexer (MUX), for performing clock multiplexing corresponding to the set of disk switching paths; and
utilizing the BMC to enable respective SSD reset signals of the group of storage devices implemented with SSDs.

10. The method of claim 1, wherein the multiple groups of storage devices are implemented with multiple groups of single port SSDs, respectively, and the group of storage devices are implemented with a group of single port SSDs among the multiple groups of single port SSDs; and the disk manager module is configured to perform the multiple groups of operations respectively corresponding to the multiple disk pools in the parallel processing manner, for managing the group of single port SSDs with the multiple disk pools, so as to prevent malfunction of any single port SSD among the group of single port SSDs.

11. An all flash array (AFA) server, comprising:
multiple nodes, wherein any node of the multiple nodes comprises:
at least one processor, arranged to control operations of the any node under control of multiple program modules; and
multiple hardware components in a hardware layer of the any node; and
a plurality of storage devices, the plurality of storage devices comprising multiple groups of storage devices, wherein the multiple groups of storage devices are implemented with multiple groups of solid state drives (SSDs), respectively;
wherein:
the any node utilizes a disk manager module among the multiple program modules running on the any node to trigger the hardware layer of the any node to perform disk switching control in a high availability (HA) architecture of the AFA server, for controlling the any node to enable a set of disk switching paths between the any node and a group of storage devices among multiple sets of disk switching paths between the multiple nodes and the multiple groups of storage devices, the multiple groups of storage devices comprising the group of storage devices; and
the any node utilizes the disk manager module to perform multiple groups of operations respectively corresponding to multiple disk pools in a parallel processing manner, for managing the group of storage devices with the multiple disk pools, wherein the multiple disk pools comprise an active disk pool, an inserted disk pool, and a failure disk pool, and the multiple groups of operations comprise:
a first group of operations corresponding to the active disk pool, configured to manage multiple active storage devices in the active disk pool;
a second group of operations corresponding to the inserted disk pool, configured to manage any inserted storage device in the inserted disk pool, wherein the any inserted storage device represents any new storage device added into the group of storage devices; and
a third group of operations corresponding to the failure disk pool, configured to manage any failure storage device in the failure disk pool, wherein the any failure storage device represents any critical or invalid storage device needing being removed from the group of storage devices;
wherein the disk manager module running on the any node comprises at least three threads, and the at least three threads are configured to perform the multiple groups of operations respectively corresponding to the multiple disk pools in the parallel processing manner, for managing the group of storage devices with the multiple disk pools, respectively.

* * * * *